(12) United States Patent
Kong et al.

(10) Patent No.: US 11,497,087 B2
(45) Date of Patent: Nov. 8, 2022

(54) HEATING WIRE APPARATUS FOR VEHICLE SAFETY GLASS

(71) Applicants: HYUNDAI MOTOR COMPANY, Seoul (KR); KIA MOTORS CORPORATION, Seoul (KR); KCC GLASS CORPORATION, Seoul (KR)

(72) Inventors: Nak Kyoung Kong, Gyeonggi-do (KR); Jong Min Park, Seoul (KR); Ki Hong Lee, Seoul (KR); Kang Sun Lee, Seongnam-si (KR); Seung Hyeok Chang, Suwon-si (KR); Kuk Bum Lee, Sejong-si (KR); Eun Ho Lee, Sejong-si (KR); Chan Hee Lee, Sejong-si (KR)

(73) Assignees: HYUNDAI MOTOR COMPANY, Seoul (KR); KIA MOTORS CORPORATION, Seoul (KR); KCC GLASS CORPORATION, Seoul (KR)

( * ) Notice: Subject to any disclaimer, the term of this patent is extended or adjusted under 35 U.S.C. 154(b) by 547 days.

(21) Appl. No.: 16/419,998

(22) Filed: May 22, 2019

(65) Prior Publication Data
US 2020/0084840 A1    Mar. 12, 2020

(30) Foreign Application Priority Data
Sep. 10, 2018   (KR) .................. 10-2018-0107596

(51) Int. Cl.
*H05B 3/84*    (2006.01)
*H05B 3/86*    (2006.01)
(Continued)

(52) U.S. Cl.
CPC ............. *H05B 3/86* (2013.01); *B60J 1/002* (2013.01); *B60R 16/04* (2013.01); *B60S 1/026* (2013.01);
(Continued)

(58) Field of Classification Search
None
See application file for complete search history.

(56) References Cited

U.S. PATENT DOCUMENTS 2,503,457 A * 4/1950 Speir ................. B64D 15/12
                                                                 219/528
2,878,357 A * 3/1959 Thomson .............. H05B 3/84
                                                                 338/292

(Continued)

FOREIGN PATENT DOCUMENTS

GB         2372927 A *  9/2002  .......... H05B 1/0236
JP      2002264780 A *  9/2002
(Continued)

OTHER PUBLICATIONS

JP 2002-264780 A, Ueno et al, "Fog Prevention Glass," Sep. 2002, partial translation (Year: 2002).*
(Continued)

*Primary Examiner* — Joseph M. Pelham
(74) *Attorney, Agent, or Firm* — Morgan, Lewis & Bockius LLP (57) ABSTRACT

A heating wire apparatus for a vehicle safety glass includes: a plurality of bus bars located at a periphery of the vehicle safety glass; a plurality of heating wires having a serial pattern between the plurality of bus bars; and a battery that applies a voltage to the plurality of heating wires.

5 Claims, 5 Drawing Sheets

(51) Int. Cl.
    *H05B 3/02*         (2006.01)
    *H05B 3/03*         (2006.01)
    *H05B 3/06*         (2006.01)
    *B60S 1/02*         (2006.01)
    *H02G 5/02*        (2006.01)
    *B60R 16/04*       (2006.01)
    *B60J 1/00*         (2006.01)
    *B60S 1/26*         (2006.01)

(52) U.S. Cl.
    CPC .................. *B60S 1/26* (2013.01); *H02G 5/02* (2013.01); *H05B 3/03* (2013.01); *H05B 3/84* (2013.01); *H05B 3/06* (2013.01); *H05B 2203/002* (2013.01); *H05B 2203/007* (2013.01); *H05B 2203/014* (2013.01)

(56) References Cited

U.S. PATENT DOCUMENTS

| | | | | |
|---|---|---|---|---|
| 3,792,232 | A * | 2/1974 | Zarenko | B32B 17/10761 219/522 |
| 3,982,092 | A * | 9/1976 | Marriott | H05B 3/84 219/203 |
| 4,039,775 | A * | 8/1977 | Andra | B01L 7/00 219/385 |
| 4,396,826 | A * | 8/1983 | Orcutt | B32B 17/10018 156/273.9 |
| 4,513,196 | A * | 4/1985 | Bartelsen | H05B 3/84 219/203 |
| 5,182,431 | A * | 1/1993 | Koontz | H05B 3/84 219/203 |
| 8,563,899 | B2 * | 10/2013 | Baranski | H05B 3/86 219/203 |
| 9,029,735 | B2 | 5/2015 | Choi et al. | |
| 2007/0278200 | A1* | 12/2007 | Muromachi | H05B 3/86 219/203 |
| 2013/0092676 | A1* | 4/2013 | Offermann | B32B 17/10348 219/203 |
| 2013/0153559 | A1 | 6/2013 | Choi et al. | |
| 2018/0325311 | A1* | 11/2018 | Feldman | F24C 7/043 |
| 2019/0193530 | A1* | 6/2019 | Chiba | B32B 17/10036 |

FOREIGN PATENT DOCUMENTS

| | | | |
|---|---|---|---|
| KR | 10-0290601 B1 | 4/2000 | |
| KR | 10-2012-0090791 A | 8/2012 | |
| WO | WO-2018203563 A1 * | 11/2018 | ................ B60S 1/02 |
| WO | WO-2019230733 A1 * | 12/2019 | ............. B60S 1/026 |

OTHER PUBLICATIONS

Office Action issued in Korean Patent Application No. 10-2018-0107596 dated Oct. 30, 2019.

* cited by examiner

HEATING WIRE APPARATUS FOR VEHICLE SAFETY GLASS

CROSS-REFERENCE TO RELATED APPLICATION

This application claims the benefit of priority to Korean Patent Application No. 10-2018-0107596, filed in the Korean Intellectual Property Office on Sep. 10, 2018, the entire contents of which are incorporated herein by reference.

TECHNICAL FIELD

The present disclosure relates to a heating wire apparatus applied to vehicle safety glass.

BACKGROUND

In order to safely drive a vehicle, it is important for the driver to secure a field of view. Especially, when there is a large temperature difference between inside and outside the vehicle in the event of rainfall or in the winter, moisture may be formed on vehicle windows by the temperature difference and covers the windows of the vehicle to make the driver's visibility very poor.

In this case, the driver nay operate a heater or an air conditioner (AC) to supply warm or cool air to a windshield and the front door glass of the vehicle, thereby securing the driver's front view and side rear view. However, in the case of the rear window, it is impossible to secure the driver's rear view by operating the heater or AC due to the structural nature of the vehicle.

Figure 1:
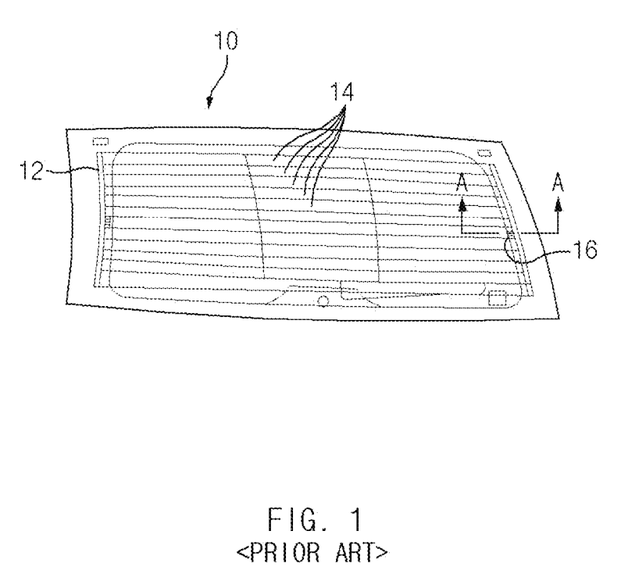
FIG. 1 is a view illustrating a heating wire apparatus for vehicle safety glass in the related art.

Due to this limitation, the vehicle is equipped with a heating wire apparatus. As illustrated in FIG. 1, a heating wire apparatus in related art includes bus bars 12 installed at left and right edges of a rear surface of a rear window 10 to face each other, a plurality of heating wires 14 of a layered structure across the rear window 10 between the two bus bars 12, and a heating wire terminal 16 secured to the bus bar 12 on one side to supply power to the bus bar 12. The heating wire terminal 16 is soldered to a bottom surface of the bus bar 12 secured to the rear surface of the rear window 10 and is connected with a battery by a power cable connected to a lower end of the bus bar 12 through a connector.

The conventional heating wire apparatus with the above-described structure has a problem in that when applied to an electric vehicle equipped with a 48V-battery, the heating wire apparatus consumes 16 times more power to overheat than when applied to an electric vehicle equipped with a 12V-battery, because the plurality of heating wires 14 are connected in parallel between the two bus bars 12.

To solve the problem, a method of reducing the voltage of the battery through a separate DC-DC converter has been proposed. However, the method has drawbacks of high production cost because the DC-DC converter has to be additionally included in the heating wire apparatus.

SUMMARY

The present disclosure has been made to solve the above-mentioned problems occurring in the prior art while advantages achieved by the prior art are maintained intact.

An aspect of the present disclosure provides a heating wire apparatus for vehicle safety glass that has a heating wire pattern optimized for the voltage of a battery included a vehicle.

The technical problems to be solved by the present disclosure are not limited to the aforementioned problems, and any other technical problems not mentioned herein will be clearly understood from the following description by those skilled in the art to which the present disclosure pertains. It will be easily understood that the aspects and advantages of the present disclosure can be accomplished by the means set forth in the appended claims and combinations thereof.

According to an aspect of the present disclosure, a heating wire apparatus for a vehicle safety glass includes: a plurality of bus bars located at a periphery of the vehicle safety glass; a plurality of heating wires having a serial pattern between the plurality of bus bars; and a battery that applies a voltage to the plurality of heating wires.

The plurality of bus bars may include a first bus bar located at an upper end of one side of the vehicle safety glass, a second bus bar located at a lower end of the one side of the vehicle safety glass, a third bus bar located at an upper end of an opposite side of the vehicle safety glass, and a fourth bus bar located at a lower end of the opposite side of the vehicle safety glass. The plurality of heating wires may have the serial pattern to sequentially connect the first bus bar, the second bus bar, the third bus bar, and the fourth bus bar.

The first bus bar and the fourth bus bar may have the same length, the second bus bar and the third bus bar may have the same length, and the second bus bar may be two times longer than the first bus bar. A number of heating wires between the first bus bar and the second bus bar, a number of heating wires between the second bus bar and the third bus bar, and a number of heating wires between the third bus bar and the fourth bus bar are all the same.

The first bus bar and the fourth bus bar may include a connector for receiving the voltage of the battery.

Spacing between the first bus bar and the second bus bar and spacing between the third bus bar and the fourth bus bar may be a threshold value or more.

The plurality of bus bars may include a first bus bar located at a first position on one side of a lower end of the vehicle safety glass, a second bus bar located at a second position on the one side of the lower end of the vehicle safety glass, a third bus bar located at a first position on an opposite side of the lower end of the vehicle safety glass, and a fourth bus bar located at a second position on the opposite side of the lower end of the vehicle safety glass. The plurality of heating wires may have the serial pattern to sequentially connect the first bus bar, the fourth bus bar, the second bus bar, and the third bus bar.

The first bus bar and the third bus bar may have the same length, the second bus bar and the fourth bus bar may have the same length, and the second bus bar may be two times longer than the first bus bar. A number of heating wires between the first bus bar and the fourth bus bar, a number of heating wires between the fourth bus bar and the second bus bar, and a number of heating wires between the second bus bar and the third bus bar are all the same.

The first bus bar and the third bus bar may include a connector for receiving the voltage of the battery.

Spacing between the first bus bar and the second bus bar and spacing between the third bus bar and the fourth bus bar may be a threshold value or more.

The plurality of bus bars may include a first bus bar located at an upper end of one side of the vehicle safety glass, a second bus bar located at the center of the one side of the vehicle safety glass, a third bus bar located at a lower end of the one side of the vehicle safety glass, a fourth bus bar located at an upper end of an opposite side of the vehicle safety glass, and a fifth bus bar located at a lower end of the opposite side of the vehicle safety glass. The plurality of heating wires may have the serial pattern to sequentially connect the first bus bar, the fourth bus bar, the second bus bar, the fifth bus bar, and the third bus bar.

The first bus bar and the third bus bar may have the same length, the second bus bar, the fourth bus bar, and the fifth bus bar may have the same length, and the second bus bar may be two times longer than the first bus bar. A number of heating wires between the first bus bar and the fourth bus bar, a number of heating wires between the fourth bus bar and the second bus bar, a number of heating wires between the second bus bar and the fifth bus bar, and a number of heating wires between the fifth bus bar and the third bus bar are all the same.

The first bus bar and the third bus bar may include a connector for receiving the voltage of the battery.

Spacing between the first bus bar, the second bus bar, and the third bus bar and spacing between the fourth bus bar and the fifth bus bar may be a threshold value or more.

The plurality of heating wires may be printed on the vehicle safety glass to have spacing of a threshold value or more therebetween. In this case, the plurality of heating wires may have a length and a thickness that are determined such that a temperature difference therebetween is maintained at less than a threshold value.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. It should be understood that even if shown in different drawings, identical components are provided with identical reference numerals in the drawings. Furthermore, in describing the embodiments of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe components of the present disclosure. Such terms are only used to distinguish one component from another component, and the substance, sequence, order, or number of these components is not limited by these terms. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
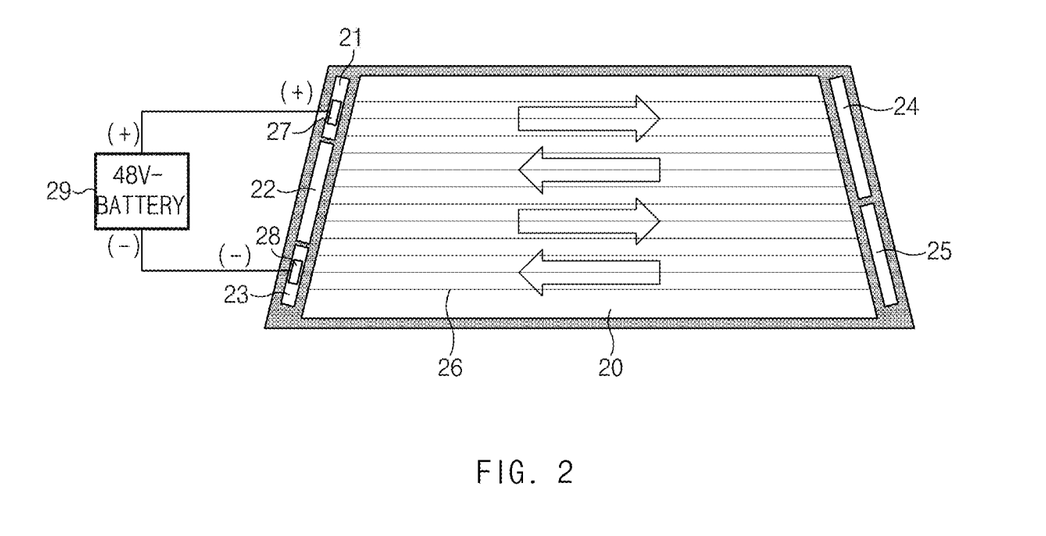
FIG. 2 is a structural view illustrating a heating wire apparatus for vehicle safety glass according to an exemplary embodiment of the present disclosure.

FIG. 2 is a structural view illustrating a heating wire apparatus for vehicle safety glass according to an exemplary embodiment of the present disclosure.

As illustrated in FIG. 2, the heating wire apparatus for vehicle safety glass according an exemplary embodiment of to the present disclosure may include vehicle safety glass 20, a plurality of bus bars 21 to 25, a plurality of heating wires 26, a plurality of connectors 27 and 28, and a battery 29.

The vehicle safety glass 20 may preferably be a sheet of glass located at the back of a vehicle. Without being limited thereto, however, the vehicle safety glass 20 may include the front glass (the windshield), door glass, or the like.

The plurality of bus bars 21 to 25 may be located at the periphery of the vehicle safety glass 20 and may serve as mediums through which the plurality of heating wires 26 form a serial pattern. For reference, a bus bar may refer to a bar conductor that enables an electrical connection.

The plurality of heating wires 26 may remove frost or ice with which the vehicle safety glass 20 is covered, and may form a serial pattern through the plurality of bus bars 21 to 25.

The plurality of connectors 27 and 28 may include the plus connector 27 and the minus connector 28 and may apply voltage from the battery 29 to the plurality of heating wires 26.

The battery 29 may apply the voltage to the plurality of heating wires 26 through the plus connector 27 and the minus connector 28. The voltage of the battery 29 may be 12 V, 24 V, 36 V, 48 V, or the like.

Hereinafter, structures of bus bars and heating wires optimized for a 48V-battery will be described in detail with reference to FIG. 2. The 48-V battery may also be applied to a mild hybrid electric vehicle (MHEV).

In FIG. 2, the plurality of bus bars 21 to 25 may include the first bus bar 21 located at an upper end of one side of the vehicle safety glass 20, the second bus bar 22 located at the center of the one side of the vehicle safety glass 20, the third bus bar 23 located at a lower end of the one side of the vehicle safety glass 20, the fourth bus bar 24 located at an upper end of an opposite side of the vehicle safety glass 20, and the fifth bus bar 25 located at a lower end of the opposite side of the vehicle safety glass 20. In this case, the plurality of heating wires 26 may have a serial pattern to sequentially connect the first bus bar 21, the fourth bus bar 24, the second bus bar 22, the fifth bus bar 25, and the third bus bar 23.

Here, the first bus bar 21 and the third bus bar 23 may have the same length, the second bus bar 22, the fourth bus bar 24, and the fifth bus bar 25 may have the same length, and the second bus bar 22 may be two times longer than the first bus bar 21. This is because the number of heating wires between the first bus bar 21 and the fourth bus bar 24, the number of heating wires between the fourth bus bar 24 and the second bus bar 22, the number of heating wires between the second bus bar 22 and the fifth bus bar 25, and the number of heating wires between the fifth bus bar 25 and the third bus bar 23 are all the same.

For example, assuming that the total number of heating wires is 12, the number of heating wires with the first bus bar 21 as a starting point and the fourth bus bar 24 as an ending point (hereinafter, referred to as first heating wires) may be 3, the number of heating wires with the fourth bus bar 24 as a starting point and the second bus bar 22 as an ending point (hereinafter, referred to as second heating wires) may also be 3, the number of heating wires with the second bus bar 22 as a starting point and the fifth bus bar 25 as an ending point (hereinafter, referred to as third heating wires) may also be 3, and the number of heating wires with the fifth bus bar 25 as a starting point and the third bus bar 23 as an ending point (hereinafter, referred to as fourth heating wires) may also be 3. In this case, the current direction through the first heating wires may be the same as the current direction through the third heating wires, and the current direction through the second heating wires may be the same as the current direction through the fourth heating wires.

The first bus bar 21 may include the plus connector 27 for receiving the plus voltage of the battery 29, and the third bus bar 23 may include the minus connector 28 for receiving the minus voltage of the battery 29.

The spacing between the first bus bar 21, the second bus bar 22, and the third bus bar 23 and the spacing between the fourth bus bar 24 and the fifth bus bar 25 may be a preset threshold value or more prevent a short that may occur between the bus bars.

The plurality of heating wires 26 may be printed on the vehicle safety glass 20 to have spacing of a threshold value (e.g., 30 mm) or more therebetween.

The plurality of heating wires 26 may have a length and a thickness that are determined such that the temperature difference therebetween is maintained at less than a threshold value (e.g., 1 degree Celsius).

Hereinafter, structures of bus bars and heating wires optimized for a 36V-battery will be described with reference to FIG. 3.

Figure 3:
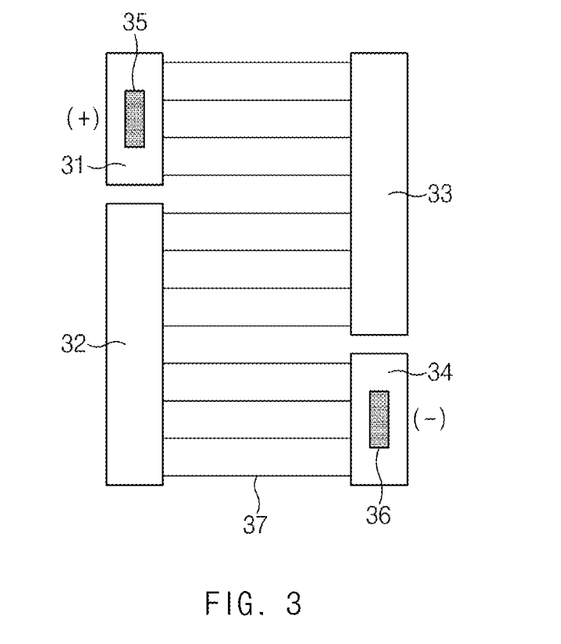
FIG. 3 is a structural view illustrating a heating wire apparatus for vehicle safety glass according to another exemplary embodiment of the present disclosure.

As illustrated in FIG. 3, a plurality of bus bars may include a first bus bar 31 located at an upper end of one side of vehicle safety glass, a second bus bar 32 located at a lower end of the one side of the vehicle safety glass, a third bus bar 33 located at an upper end of an opposite side of the vehicle safety glass, and a fourth bus bar 34 located at a lower end of the opposite side of the vehicle safety glass. In this case, a plurality of heating wires 37 may have a serial pattern to sequentially connect the first bus bar 31, the third bus bar 33, the second bus bar 32, and the fourth bus bar 34.

Here, the first bus bar 31 and the fourth bus bar 34 may have the same length, the second bus bar 32 and the third bus bar 33 may have the same length, and the second bus bar 32 may be two times longer than the first bus bar 31. This is because the number of heating wires between the first bus bar 31 and the third bus bar 33, the number of heating wires between the third bus bar 33 and the second bus bar 32, and the number of heating wires between the second bus bar 32 and the fourth bus bar 34 are all the same.

For example, assuming that the total number of heating wires is 12, the number of heating wires with the first bus bar 31 as a starting point and the third bus bar 33 as an ending point (hereinafter, referred to as first heating wires) may be 4, the number of heating wires with the third bus bar 33 as a starting point and the second bus bar 32 as an ending point (hereinafter, referred to as second heating wires) may also be 4, and the number of heating wires with the second bus bar 32 as a starting point and the fourth bus bar 34 as an ending point (hereinafter, referred to as third heating wires) may also be 4. In this case, the current direction through the first heating wires may be the same as the current direction through the third heating wires, and the current direction through the second heating wires may be opposite to the current direction through the first heating wires.

The first bus bar 31 may include a connector 35 for receiving the plus voltage of the battery 29, and the fourth bus bar 34 may include a connector 36 for receiving the minus voltage of the battery 29.

The spacing between the first bus bar 31 and the second bus bar 32 and the spacing between the third bus bar 33 and the fourth bus bar 34 may be set to a threshold value or more. This is to prevent a short that may occur between the bus bars.

The plurality of heating wires 37 may be printed on the vehicle safety glass to have spacing of a threshold value (e.g., 30 mm) or more therebetween.

The plurality of heating wires 37 may have a length and a thickness that are determined such that the temperature difference therebetween is maintained at less than a threshold value (e.g., 1 degree Celsius).

Hereinafter, structures of bus bars and heating wires optimized for a 36V-battery will be described with reference to FIG. 4.

Figure 4:
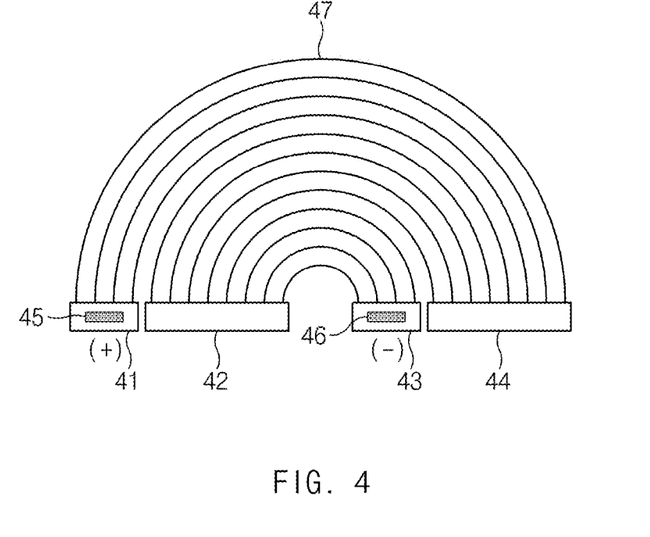
FIG. 4 is a structural view illustrating a heating wire apparatus for vehicle safety glass according to another exemplary embodiment of the present disclosure.

As illustrated in FIG. 4, a plurality of bus bars may include a first bus bar 41 located at a first position on one side of a lower end of vehicle safety glass, a second bus bar 42 located at a second position on the one side of the lower end of the vehicle safety glass, a third bus bar 43 located at a first position on an opposite side of the lower end of the vehicle safety glass, and a fourth bus bar 44 located at a second position on the opposite side of the lower end of the vehicle safety glass. In this case, a plurality of heating wires 47 may have a serial pattern in a curved form to sequentially connect the first bus bar 41, the fourth bus bar 44, the second bus bar 42, and the third bus bar 43.

Here, the first bus bar 41 and the third bus bar 43 may have the same length, the second bus bar 42 and the fourth bus bar 44 may have the same length, and the second bus bar 42 may be two times longer than the first bus bar 41. This is because the number of heating wires between the first bus bar 41 and the fourth bus bar 44, the number of heating wires between the fourth bus bar 44 and the second bus bar 42, and the number of heating wires between the second bus bar 42 and the third bus bar 43 are all the same.

For example, assuming that the total number of heating wires is 12, the number of heating wires with the first bus bar 41 as a starting point and the fourth bus bar 44 as an ending point (hereinafter, referred to as first heating wires) may be 4, the number of heating wires with the fourth bus bar 44 as a starting point and the second bus bar 42 as an ending point (hereinafter, referred to as second heating wires) may also be 4, and the number of heating wires with the second bus bar 42 as a starting point and the third bus bar 43 as an ending point (hereinafter, referred to as third heating wires) may also be 4. In this case, the current direction through the first heating wires may be the same as the current direction through the third heating wires, and the current direction through the second heating wires may be opposite to the current direction through the first heating wires.

The first bus bar 41 may include a connector 45 for receiving the plus voltage of the battery 29, and the third bus bar 43 may include a connector 46 for receiving the minus voltage of the battery 29.

The spacing between the first bus bar 41 and the second bus bar 42 and the spacing between the third bus bar 43 and the fourth bus bar 44 may be set to a threshold value or more. This is to prevent a short that may occur between the bus bars.

The plurality of heating wires 47 may be printed on the vehicle safety glass to have spacing of a threshold value (e.g., 30 mm) or more therebetween.

The plurality of heating wires 47 may have a length and a thickness that are determined such that the temperature difference therebetween is maintained at less than a threshold value (e.g., 1 degree Celsius).

Figure 5A:
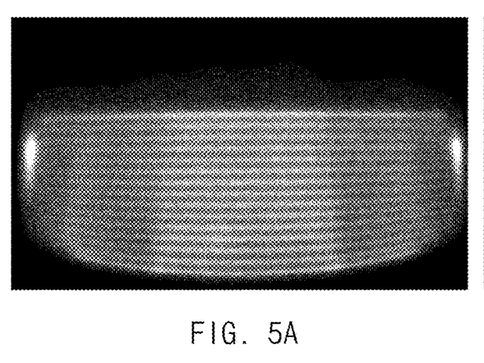
FIGS. 5A and 5B are views illustrating the performance of the heating wire apparatus for vehicle safety glass according to the present disclosure.
Figure 5B:
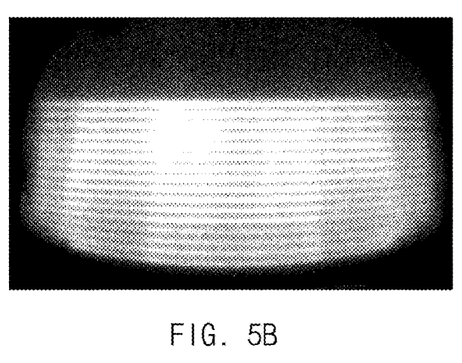

FIGS. 5A and 5B are views illustrating the performance of the heating wire apparatus for vehicle safety glass according to the present disclosure.

FIG. 5A illustrates a comparative example in which the temperature of heating wires is 53.5 degrees Celsius, with a voltage of 12 V, a resistance of 0.7Ω, a specific resistance of 1.55Ω, a current of 18.3 A, and a power of 220 W.

FIG. 5B illustrates a result according to the present disclosure in which the temperature of heating wires is 55.4 degrees Celsius, which is similar to that of the heating wires in the comparative example, with a voltage of 48 V, a resistance of 10.4Ω, a specific resistance of 2.1Ω, a current of 4.6 A, and a power of 220 W.

Consequently, the present disclosure implements a heating wire structure with a serial pattern to exhibit performance similar to that in the comparative example, without overheating at a voltage of 48 V except through a DC-DC converter.

According to the present disclosure, the heating wire apparatus has the heating wire pattern optimized for the voltage of the battery included in the vehicle, thereby exhibiting optimal heating performance even at high voltage.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A heating wire apparatus for a vehicle safety glass comprising:
 a plurality of bus bars located at a periphery of the vehicle safety glass;
 a plurality of heating wires having a serial pattern between the plurality of bus bars; and
 a battery configured to apply a voltage to the plurality of heating wires,
 wherein the plurality of bus bars include:
  a first bus bar located at a first position on a first side of a lower end of the vehicle safety glass;
  a second bus bar located at a second position on the first side of the lower end of the vehicle safety glass;
  a third bus bar located at a third position on a second side, which is an opposite side to the first side, of the lower end of the vehicle safety glass; and
  a fourth bus bar located at a fourth position on the second side of the lower end of the vehicle safety glass,
 wherein the plurality of heating wires have the serial pattern in a curved shape sequentially connecting the first bus bar, the fourth bus bar, the second bus bar, and the third bus bar, and
 wherein the plurality of heating wires are equally spaced apart from each other.

2. The heating wire apparatus of claim 1, wherein the first bus bar and the third bus bar have the same length,
 wherein the second bus bar and the fourth bus bar have the same length, and
 wherein the second bus bar has a length twice longer than that of the first bus bar.

3. The heating wire apparatus of claim 2, wherein a number of heating wires between the first bus bar and the fourth bus bar, a number of heating wires between the fourth bus bar and the second bus bar, and a number of heating wires between the second bus bar and the third bus bar are all the same.

4. The heating wire apparatus of claim 1, wherein the first bus bar and the third bus bar include a connector configured to receive the voltage of the battery.

5. The heating wire apparatus of claim 1, wherein the first bus bar and the second bus bar are spaced apart from each other by 30 mm the third bus bar and the fourth bus bar are spaced apart from each other by 30 mm.

* * * * *